LASER RECORDING APPARATUS

Filed Nov. 29, 1963

INVENTOR.
NORMAN L. STAUFFER
BY Arthur H. Swanson
ATTORNEY.

United States Patent Office 3,256,524

Patented June 14, 1966

3,256,524

LASER RECORDING APPARATUS

Norman L. Stauffer, Englewood, Colo., assignor to Honeywell Inc., a corporation of Delaware Filed Nov. 29, 1963, Ser. No. 326,720
4 Claims. (Cl. 346—76)

This invention relates to data signal recording apparatus. More specifically, the present invention relates to laser beam signal recording devices.

An object of the present invention is to provide a novel laser beam recording apparatus.

Another object of the present invention is to provide a novel signal recording apparatus utilizing laser beam writing means.

Still another object of the present invention is to provide a novel analog signal recording apparatus.

A further object of the present invention is to provide a novel digital signal recording apparatus.

A still further object of the present invention is to provide a novel multiple channel recording apparatus utilizing a laser beam writing means.

A still further object of the present invention is to provide a novel recording apparatus utilizing a laser beam writing means to produce a perforated record.

Still another further object of the present invention is to provide a novel laser beam recording apparatus to produce a visually contrasting record.

Still another object of the present invention is to provide a novel laser beam recording apparatus, as set forth herein, having a simple operation and construction.

In acomplishing these and other objects, there has been provided, in accordance with the present invention, a laser beam recording apparatus, utilizing a laser source of coherent radiation which is arranged to provide a recording on a thin film medium by deteriorating an incremental portion of the medium to produce either a hole or a contrasting mark. In the embodiment of this invention herein illustrated, the laser beam may be split into a plurality of similar beams which are directed on respective selectively movable mirrors. The mirrors are arranged to reflect their respective impinging beam onto a recording medium. The movement of each of the mirrors is effective to deflect the corresponding laser beam to vary the position of its effect on the recording medium. A beam focusing system may be provided for each laser beam to focus the laser beam into a record medium affecting spot. Since the laser beam is normally a confined beam, it may be used without further focusing if an adequate energy level is available and its effect on the recording medium produces a suitable recording; e.g., a narrow trace or small hole.

A better understanding of the present invention may be had when the following detailed description is read in connection with the accompanying drawings, in which.

Figure 1:
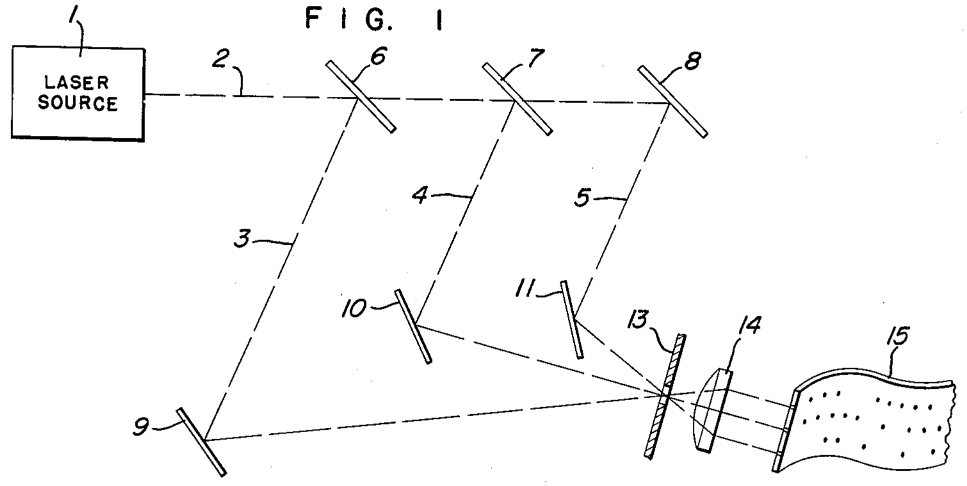
FIG. 1 is a pictorial drawing of a digital recorder embodying the present invention.

Referring to FIG. 1 in more detail, there is shown a laser beam recording apparatus having a laser beam source 1 which is effective to produce a coherent laser beam 2. The laser source 1 may be any suitable laser device for producing a high energy coherent beam of radiation at either a high repetition rate or a continuous output, such devices being well-known in the art. For example, it has been found that a beam repetition rate of one to three thousand cycles is adequate to obtain a useful recording. The necessary energy output of the laser beam 2 is dependent on the desired effect on a recording medium. Using a thin aluminum film of about $10^{-5}$ cm. thickness mounted on a transparent substrate, it has been determined that an energy input of about 0.2 joule/cm.$^2$ is effective to produce holes in the aluminum film. Alternatively, either other materials may be used having lower heats of vaporization or the laser beam may be employed to produce only a partial destruction of the recording medium to obtain a contrasting record.

The laser beam 2 is split into a plurality of separate beams 3, 4, and 5 by a plurality of beam splitting mirrors 6, 7, and 8, respectively. The beams 3, 4, and 5 are directed onto selectively movable mirrors 9, 10, and 11, respectively. The mirrors 9, 10, and 11 may be operated by any suitable individual input signal means to affect the direction of the reflected path of a corresponding laser beam; e.g., galvanometer movements. The mirrors 9, 10, and 11 are arranged to direct their respective beams, in one position of the mirrors, through an aperture in a blocking element 13. After passing through the aperture in element 13, the beams 3, 4, and 5 may be focused by a lens 14 onto the confines of a recording medium 15. The recording medium 15 may comprise a substantially opaque film; e.g., a $10^{-5}$ cm. thick aluminum film, on a transparent substrate. Alternatively, using a higher power laser beam, the recording medium 15 may be a single layer material which is capable of being selectively and incrementally destroyed by the laser beam to produce a transparent aperture. The lens 14 is effective to focus the laser beams 3, 4, and 5 onto respective areas of the recording medium 15 to produce separate corresponding effects thereon.

In operation, the mirrors 9, 10, and 11 are arranged to selectively either direct their respective laser beam either on the medium 15 or a non-apertured portion of element 13 in response to mirror driving signals. When the laser beams are directed onto the medium 15, they are effective to produce a manifestation dependent on their energy level. Conversely, during the time when the laser beams are directed onto a solid surface of the element 13, they do not produce an effect on the medium 15. Thus, the apparatus shown in FIG. 1 is effective to produce a digital recording comprising selectively arranged spots or holes on the recording medium 15. The transverse arrangement of the recorded manifestations is determined by the geometry of the placement of the mirrors 9, 10, and 11 and may be, as shown in FIG. 1, in a line perpendicular to the sides of the medium 15. The medium 15 may be transported past the lens 15 by a transport means, not shown, with any suitable motion which is effective to longitudinally separate the transverse record lines. For example, the recording medium 15 may either be stepped to each recording position or continuously driven with separation effected by synchronizing the actuation of the mirrors 9, 10, and 11 with the movement of the medium 15.

The end result of the apparatus shown in FIG. 1 is to produce an equivalent to a punched tape with the recorded information arranged in a coded pattern. While for purposes of illustration, only three beams and, hence, three record indications are shown, it is to be noted that the number of beams could be easily increased or decreased to any desired number to produce a desired record code; e.g., a five hole code. While the conventional tape punches used to produce punched tape are limited to about 300 steps per second, it will be appreciated that the present invention is effective to produce much higher readout speeds and, using a continuous-type laser operation, is bounded only by the limitations for driving the recording medium 15 and the mirrors 9, 10, and 11.

Figure 2:
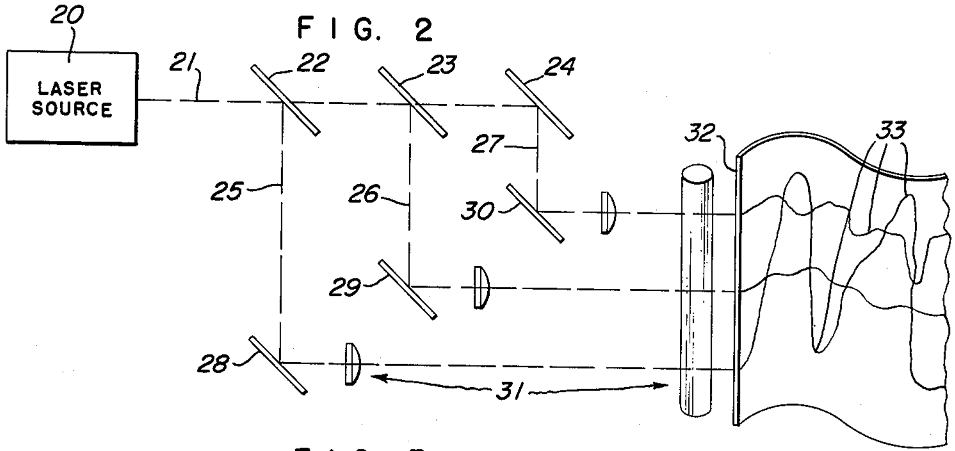
FIG. 2 is a pictorial drawing of an analog recorder embodying the present invention.

In FIG. 2, there is shown an analog recording system also embodying the present invention. A laser source 20 is effective to produce a coherent laser beam 21 which is split by a plurality of beam splitting mirrors 22, 23, and 24 into a plurality of secondary beams, 25, 26, and 27, respectively. These beams are directed onto corresponding selectively movable mirrors 28, 29, and 30. The reflected beams from the mirrors 28, 29, and 30 may be further focused by a lens system 31 onto a recording medium to produce a plurality of record traces 32. The need for further focusing is dependent on the suitability of the record obtained with an unfocused beam, as previously discussed. Inasmuch as the record traces 32 are continuous analog recording, the power output of the laser 20 and/or the material comprising member 31 may be selected to produce a succession of holes or to produce a discoloration of the member 31 rather than an actual puncture therethrough.

The record member 31 is driven past the lens system 31 to allow the analog recording to be placed thereon. The mirrors 28, 29, and 30 are selectively and individually driven by any suitable means; e.g., galvanometer coils, to provide a mechanical position representation of corresponding input signals. Thus, the respective laser beams are continuously positioned on the medium 31 to produce an analog recording representation of the respective input signals.

Figure 3:
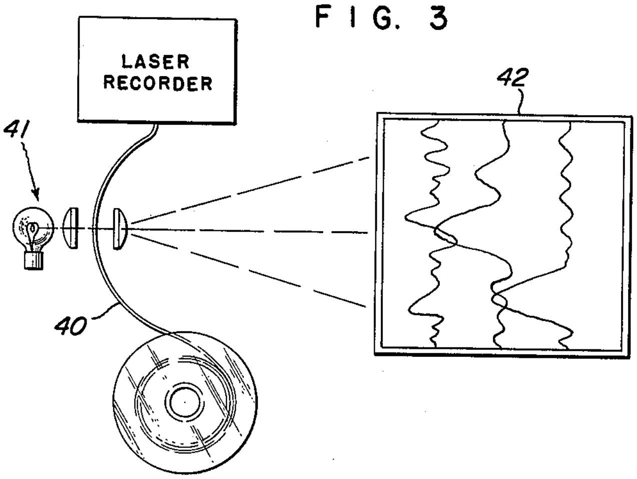
FIG. 3 is a pictorial view of a projection arrangement for enlarging a miniature laser recording.

In FIG. 3, there is shown a projection system for a laser recording which may be produced on a small record medium 40 approximating a film size; e.g.; 35 mm. Thus, the energy of the laser beam, particularly in the analog recording shown in FIG. 2, would be distributed over a smaller area to concentrate the recording energy thereon to produce the desired effect. The small recording is then projected by an enlarger 41 onto a screen 42 in enlarged form.

Accordingly, it may be seen that there has been presented in accordance with the present invention, a novel recording apparatus using a coherent laser beam for either analog or digital recording to produce a record comprising a destructive manifestation of a recording medium.

What is claimed is:

1. A recording apparatus comprising a laser beam source arranged to produce a single coherent laser beam, a plurality of beam splitting mirrors arranged in succession in a path of said laser beam and each being operative to deflect a separate portion of said laser beam into a corresponding separate path from said laser beam to produce a plurality of laser beams, record member means responsive to a laser beam to produce a laser beam response characterized by a destruction and vaporization of its physical structure in an area contacted by said laser beam whereby to form a hole in said recording medium and a plurality of deflecting means movable between a first and a second position and each arranged to be selectively located in said second position a respective one of said laser beams on said record member in a corresponding longitudinal track to produce said laser beam response thereof.

2. A recording apparatus as set forth in claim 1 wherein said deflecting means includes an apertured member arranged to intercept said laser beams in said first position of said deflecting means and to pass said laser beams through an aperture to said record member in said second position of said deflecting means.

3. A recording apparatus comprising a laser beam source arranged to produce a coherent laser beam at a substantially continuous rate, a plurality of beam splitting mirrors arranged in succession in a path of said laser beam and each being operative to deflect a separate portion of said laser beam into a corresponding separate path from said laser beam to a plurality of laser beams, record member means responsive to said similar laser beams to produce a laser beam response characterized by a partial destruction of the physical structure of said member in a surface area contacted by each of said similar beams, said area forming a contrasting record of the position of said similar beam on said surface area, and a plurality of galvanometer mirror deflecting means each arranged to selectively position a corresponding one of said similar beams on said record member in response to control signals applied to said deflecting means whereby to record the movements of each of said deflecting means as a representation of the variations of the value of respective ones of said control signals.

4. A recording apparatus as set forth in claim 3 wherein said deflecting means includes a plurality of focusing means, each operative to focus a respective one of said beams on said record member.

References Cited by the Examiner

UNITED STATES PATENTS

| | | | |
|---|---|---|---|
| 1,999,552 | 4/1935 | Ward | 88—24 |
| 2,467,950 | 4/1949 | Thompson | 346—109 X |
| 2,840,441 | 6/1958 | Owen | 346—108 |
| 2,875,017 | 2/1959 | Reynolds | 346—109 |
| 2,930,669 | 3/1960 | Licklider | 346—109 |
| 2,951,736 | 9/1960 | Black | 346—1 |
| 3,045,241 | 7/1962 | Savit | 346—109 |
| 3,046,555 | 7/1962 | Richard et al. | 346—108 |
| 3,050,731 | 8/1962 | Usdin | 346—1 |
| 3,154,370 | 10/1964 | Johnson | 346—108 |
| 3,154,371 | 10/1964 | Johnson | 346—108 |

OTHER REFERENCES

Factory, "Taming the Laser Ray for Industry," April 1962, v. 120, pages 96–97.

LEO SMILOW, *Primary Examiner.*

N. J. AQUILINO, J. W. HARTARY, *Assistant Examiners.*